(12) United States Patent
Albert et al.

(10) Patent No.: US 10,132,929 B2
(45) Date of Patent: Nov. 20, 2018

(54) LIGHT SCANNER

(71) Applicant: SICK AG, Waldkirch (DE)

(72) Inventors: Magnus Albert, Waldkirch (DE); Jörg Sigmund, Waldkirch (DE)

(73) Assignee: SICK AG, Waldkirch (DE)

( * ) Notice: Subject to any disclaimer, the term of this patent is extended or adjusted under 35 U.S.C. 154(b) by 221 days.

(21) Appl. No.: 15/141,934

(22) Filed: Apr. 29, 2016

(65) Prior Publication Data

US 2016/0327649 A1    Nov. 10, 2016

(30) Foreign Application Priority Data

May 5, 2015    (EP) ..................................... 15166414

(51) Int. Cl.

| | |
|---|---|
| *G01S 17/93* | (2006.01) |
| *F16P 3/14* | (2006.01) |
| *G01S 7/486* | (2006.01) |
| *G01S 7/497* | (2006.01) |
| *G01S 17/10* | (2006.01) |
| *G05D 1/00* | (2006.01) |

(52) U.S. Cl.
CPC .............. *G01S 17/936* (2013.01); *F16P 3/14* (2013.01); *G01S 7/4863* (2013.01); *G01S 7/497* (2013.01); *G01S 17/10* (2013.01); *G05D 1/0088* (2013.01)

(58) Field of Classification Search
CPC ........ G01S 7/4802; G01S 13/78; G01S 13/86; G01S 17/023; G01S 17/42; G01S 17/58; G01S 17/66; G01S 17/74; G01S 17/89; G01S 7/4811
See application file for complete search history.

(56) References Cited

U.S. PATENT DOCUMENTS

| | | | | |
|---|---|---|---|---|
| 2004/0233414 A1* | 11/2004 | Jamieson et al. | ........ | G01C 3/08 |
| | | | | 356/4.01 |
| 2014/0071433 A1* | 4/2014 | Eisele et al. | ............ | G01S 7/481 |
| 2014/0327902 A1* | 11/2014 | Giger et al. | ............. | G01C 3/08 |
| | | | | 356/5.01 |
| 2016/0003946 A1* | 1/2016 | Gilliland et al. | ....... | G01S 17/89 |

FOREIGN PATENT DOCUMENTS

| | | |
|---|---|---|
| EP | 2 182 377 A1 | 5/2010 |
| EP | 2 910 972 A1 | 8/2015 |

OTHER PUBLICATIONS

Pellegrini, et al., "Laser-based distance measurement using picosecond resolution time-correlated single-photon counting", Meas. Sci. Technol., vol. 11, pp. 712-716, 2000.
Search report issued in European application No. 15166414.1 dated Dec. 3, 2015.

* cited by examiner

*Primary Examiner* — Luke D Ratcliffe
(74) *Attorney, Agent, or Firm* — Nath, Goldberg & Meyer; Jerald L. Meyer

(57) ABSTRACT

A light scanner in accordance with the principle of the time of flight having at least one light transmitter (2) which transmits consecutive light pulses (3) into a measured zone (5) and having at least one light receiver (4) which receives the light pulses (3) reflected at an object (6) in the measured zone (5) and supplies them in the form of received electrical signals to a control and evaluation unit (7) which determines a distance signal representative of the distance (8) of the object (6) from the light scanner (1) while taking account of the speed of light between the transmission and reception of the light pulse (3), wherein the light receiver (4) has at least one single photon avalanche diode (9).

13 Claims, 7 Drawing Sheets

LIGHT SCANNER

Figure 1:
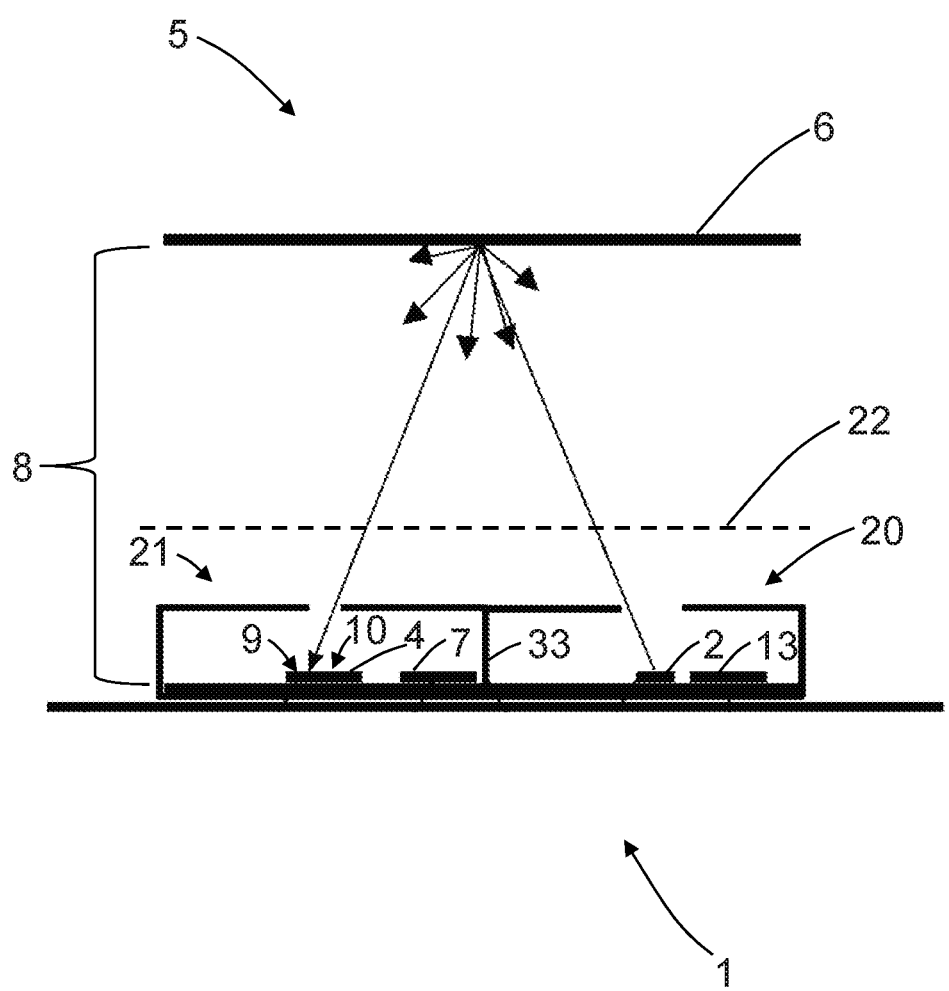

The present invention relates to a light scanner in accordance with the preamble of claim 1 as well as to a self-driving transport system in accordance with claim 15.

In inexpensive self-driving transport systems, collision avoidance is often implemented via mechanical switches, so-called bumpers, or via ultrasonic sensors. Safety laser scanners are equally used for self-driving transport systems, but are frequently too large or too expensive.

Distance-measuring sensors based on ultrasound are also frequently used for collision avoidance/near zone detection, for example in service robots or in industrial robots.

Mechanical protective devices have the disadvantage that they only respond on a contact. Furthermore, mechanical protective devices are prone to wear and have a limited durability. Furthermore no configurable protected field ranges are possible.

Ultrasonic sensors respond sensitively to pressure/temperature and/or air moisture difference. Furthermore, the directional beam characteristics of ultrasonic sensors can only be influenced with limitations due to the wavelength.

Optical safety sensors have to include a series of self-test possibilities of their measurement chain to demonstrate their functional capability in order to achieve a specific safety category or a specific safety level in accordance with a safety standard.

The testing has to be of different depths depending on the desired category. For example, according to DIN EN 61496, a loss of detectability in response time and a restriction of the detection capability must be recognized in four seconds.

Today's implementations of the self-testing of the measurement path do not allow compact, freely sensing safety sensors without a deflection unit.

Scanning safety laser scanners having the time of flight as the detection principle as a rule have test targets in the return run zone which are measured once on each revolution. As a rule, two test surfaces are attached for this purpose, with one having a very high remission and one having a very low remission. The level of the transmitted signal, the time of the transmitted signal, the level of the received signal in response to the high remission and to the low remission, for example, and the drift, e.g. due to the temperature, are tested and optionally corrected or a safety-relevant shut-down signal is output.

The total measurement chain is completely tested in this respect in the response time, e.g. within one or two revolutions of the laser scanner, even if there is no object in the monitored zone of the scanner and the scanner thus does not receive any echoes from the measured zone.

To ensure that the detection capability is also not restricted by changes on the front screen, a contamination measurement of the front screen is moreover integrated which can recognize strong transmission losses due to contamination or manipulation.

Today's safe light grids and light barriers with oppositely disposed transmitters and receivers are set up according to the closed-circuit principle. In this process, the light signal is transmitted on a direct path from the transmitter to the receiver and in so doing runs through a complete measurement chain. An interruption of this direct light path is detected. Changes of the received signal, e.g. by front screen contamination, transmitter degradation, etc. are in this respect expressed directly in the amplitude level of the received signal and can be directly detected.

Since the technical safety decision is made on the basis of the amplitude threshold, every critical deterioration in the measurement path can be recognized and a warning signal or stop signal can be output accordingly.

External reference targets are used in the detection zone of the sensor in some distance-measuring safety systems. The measurement chain to this external reference target is checked by the measured value, with above all the distance value and the signal amplitude being checked.

The measurement to a known reference contour is also possible for scanning, distance-measuring sensors, with direct changes of the distance signal and/or amplitude signal of this contour being detected and signaled.

The reference target in the return run takes up a lot of construction space and shadows a large angular range. The scanning angle is thus e.g. restricted to 275° with specific laser scanners. A larger angular range is not possible due to the covering of the reception aperture by the reference target.

Simple test surfaces as reference targets in the scanner housing are moreover complex and/or expensive to implement for biaxial systems in which the optical axes of the transmission and reception paths are not superimposed since as a rule the transmission and reception cones are not superimposed in the housing. More complex and/or expensive arrangements with deflection mirrors are therefore necessary.

Today's solutions for contamination measurement likewise take up a very large amount of construction space and cause additional costs.

With sensors without a moving deflection unit, the cyclic testing to a fixedly installed test target is not easily possible.

The kind of self-testing according to the closed-circuit principle used in today's light grids cannot be used with freely scanning light grids/light scanners since the direct counter-side is missing.

With freely scanning systems, the amplitude of the received signal in the measurement channel is above all dependent on the distance and the remission of the target or is completely lacking when the sensor looks into "infinity".

The external reference target must be in the detection zone of the sensor. This requires either a deflection unit similar to that of scanners and a regular scanning of the test target or a large field of vision which is taken up in part by the external reference target.

The external reference target can be subject to uncontrolled property changes, e.g. aging or maladjustment, change of the remission due to contamination or wetting.

An external reference target is not flexible enough or cannot be implemented for space reasons in many applications.

This solution is impractical in single-beam sensors.

It is an object of the invention to provide a compact and low-priced light scanner which can be used flexibly. It is a further object to provide a low-priced light scanner for safety applications. Furthermore, compact or complicated geometries should be able to be secured with the aid of the light scanner. A further object of the invention is a continuous self-testing of the total measurement system with light scanners operating freely in space, in particular safety light scanners without additional reference targets.

The object is satisfied in accordance with claim 1 by a light scanner in accordance with the time of flight principle having at least one light transmitter which transmits consecutive light pulses into a measured zone and having at least one light receiver which receives the light pulses reflected at an object in the measured zone and supplies them in the form of received electrical signals to a control and evaluation unit which determines a distance signal representative of the distance of the object from the light scanner from the time between the transmission and the reception of the light pulse while taking account of the speed of light, with the light receiver having at least one single photon avalanche diode.

Single photon avalanche diodes are also simply called SPADs. Other common terms are 'silicon photomultiplier' (SiPM). 'Geiger mode avalanche photon diode' or 'single photon counting diode'. Single photon avalanche diodes are photosensitive detectors which can be implemented in standard CMOS technology and which, in a similar manner to avalanche photo diodes, convert incident photons into current pulses. Unlike avalanche photo diodes, however, single photon avalanche diodes are operated over an avalanche voltage. A single incident photon thus already triggers an avalanche effect which can be detected as a current pulse. Due to the high sensitivity, namely an amplification factor of $10^6$, even the smallest received powers down to single photons can be detected.

Different time of flight methods with a corresponding evaluation can be implemented for the distance measurement.

A pulse method can be provided. For example, one or more time-to-digital converters are provided for the pulse method in which each single photon event is provided with a time stamp. With a wanted signal, a plurality of time signals therefore occur in correlation. The measured value generation takes place statistically. Background light, in contrast, generates randomly distributed time stamps.

Furthermore, a CW (continuous wave) process can be used, with a light signal being used which is constant in time. In this method, the single photon events are distributed via a gating signal into two counters and a phase is calculated from the ratio of the counts.

Furthermore, analog signals of the single photon diode array can be evaluated. They are compared with a threshold value, are sampled or are evaluated using statistical methods.

In the evaluation according to the time of flight process, an amplitude value can also be generated in addition to the distance value, e.g. by a histogram of the time stamps, by the count rate or by the voltage amplitude in an analog evaluation. A plausibility check can be carried out by the amplitude value, in particular in technical safety applications.

The light scanner in accordance with the invention has the advantage that it is of a compact design and can be accommodated in a small housing. The light scanner is furthermore an inexpensive alternative to mechanical protection systems and ultrasonic sensors. In an application or use, the light scanner offers a high flexibility for securing various geometries or scenarios, for example non-rectangular protected fields can be realized. Furthermore, single beams can be realized for the securing. Small openings or all-round securing options can also be realized in accordance with the invention. There is flexibility in the number of sensors used, from a single sensor up to systems with a number of sensors having a central controller, safety controller or a control or safety control. A high modularity is furthermore present since the number and arrangement of the light scanners is almost as desired. A high variant generation is furthermore possible through different optical variants for different ranges and viewing angles. Furthermore, different possibilities are possible for the technical safety plausibility check of the measured values.

The use of single photon avalanche diodes offers the following advantages: Single photon avalanche diodes can be manufactured in a standard CMOS process. The light scanner thus offers high integration capability, e.g. as an ASIC. The light transmitter, for example a VSCEL, a laser diode or a light emitting diode, and the control and evaluation unit or a separate light transmitter control can likewise be integrated on the chip.

The light scanner is less expensive than photosensitive receivers previously customary in safety technology. Very compact systems are possible by a multiple arrangement of light sensors. A high sensitivity down to single photons is given by the use of single photon avalanche diodes. An optional optics can thereby be designed in a very compact manner.

In accordance with the invention, a temperature compensation of the time of flight or a temperature regulation of the SPAD bias or of the single photon avalanche diode bias is possible in the light scanner. The bias of the individual single photon avalanche diodes is preferably regulated in a temperature dependent manner to maintain it in the working range of a Geiger mode. The logic for the regulation is preferably co-integrated. Furthermore, only voltages of less than 50V and no high voltages are required for the operation of the single photon avalanche diode receivers of the light sensors. Furthermore, a plausibility check is possible by an evaluation of the distance and of the signal level.

The light transmitter is in this respect optionally arranged in a first housing chamber and the light receiver in a second, adjacent housing chamber. The housing chambers are optically isolated so that there is no direct optical connection between the light transmitter and the light receiver. Only light of the light transmitter reflected or remitted at an object arrives at the light receiver.

In a further development of the invention, the light receiver has at least one array comprising single photon avalanche diodes.

So that the light receiver with the at least one single photon avalanche diode is not already saturated by single photons, e.g. by external light, a number of single photon avalanche diodes are arranged and are evaluated together. In principle, the analog signals of the single photon avalanche diode pixels or of the single photon avalanche diode elements are added. It is also possible to digitize the avalanches of each single photon avalanche diode via e.g. a comparator or e.g. an analog-to-digital converter and to evaluate them digitally. However, the avalanches of each single photon avalanche diode can also be directly digitally further processed.

To cover the option of a larger angular range by the light scanner and nevertheless to obtain the required spatial resolution for the detection of e.g. a leg, the single photon avalanche diode array can be broken down into so-called macropixels. In this respect, a plurality of spatially adjacent single photon avalanche diode cells are associated with a common evaluation and evaluate the received light from a specific angular range via a corresponding optics. The arrangement can in this respect take place in a linear or areal manner.

The dynamics and/or an external light behavior can be scaled via the different single photon avalanche diodes or the single photon avalanche diode arrays.

In an embodiment of the invention, a transmission optics, in particular a lens, is arranged in front of the light transmitter. The transmission optics is optionally integrated on a chip or in the chip housing to achieve an inexpensive and compact solution, in particular with high volumes.

The light scanner is very compact due to a high integration and a small size of the transmission optics.

Different monitoring angles and different ranges can be realized by different transmission optics.

In a further embodiment, a reception optics, in particular a lens, is arranged In front of the light receiver.

The reception optics is optionally integrated on a chip or in the chip housing to achieve an inexpensive and compact solution, in particular with high volumes.

An optical band pass filter can also be arranged, in particular vapor deposited, directly on the chip or on the light receiver to attenuate background light.

The light scanner is very compact due to a high integration and a small size of the receiver optics.

Different monitoring angles and different ranges can be realized by different reception optics.

In a further development of the invention, a further light receiver as a reference light receiver is provided as a second reception channel for a safety-relevant self-testing.

The reference light receiver is arranged in the same housing chamber as the light transmitter and is separated from the light receiver by a channel separation. The reference light receiver can in this respect be identical to the light receiver. The reference light receiver can in particular be a single photon avalanche diode array.

The reference light receiver allows the following self-tests.

First, the power, in particular the laser power, of the light transmitter can be monitored in every measurement cycle via scattered light within the housing chamber of the light scanner in the reference light receiver. Large deviations or a failure of the light transmitter can thus be recognized.

Second, the exact time behavior or timing of the light transmitter can be monitored and offsets which may occur can be corrected, e.g. on temperature influences.

Third, a contaminated front screen of the light scanner can be detected via a change of the front screen echo due to backscatter at the dirt particles on the front screen.

Fourth, manipulation attempts can likewise be recognized via the backscatter to the reference light receiver, even if the light receiver does not obtain any signal.

Fifth, in the phases in which no light is transmitted, the external light level can be measured at the reference light receiver. The corresponding measured signal can be compared with the signal of the light receiver, whereby the sensitivity of the light receiver can be verified and can be used with an optionally different scaling for checking the required signal-to-noise ratio in the actual measurement channel.

Additional measured values which are generated on the light receiver and on the reference light receiver allow a technical safety evaluation of the operational reliability.

A direct measurement of the external light level on the light receiver and optionally on the reference light receiver allow a good determination of the signal-to-noise ratio and allow a safety-relevant sensitivity of the system.

In a further development of the invention, a further light transmitter is provided as the reference light transmitter for the safety-relevant self-test.

Furthermore, a reference light transmitter can also be provided as a second light transmitter.

The reference light transmitter can be integrated in the housing chamber of the light receiver for testing the light receiver. A test of the reception channel to the time behavior or timing as well as effects dependent on the signal level can hereby be carried out. The reference light transmitter is here preferably attached close to the light receiver and can, for example, likewise be integrated in the CMOS.

Due to the spatial proximity, the additional reference light transmitter can be realized with a lower power light transmitter and thus less expensive light transmitter. The transmission power of the reference light transmitter is set such that the signal level corresponds to the actual received signals of the light receiver. The same applies to the time progression of the transmitted signal of the reference light transmitter.

Optical test pulses having different time progressions and amplitudes can be used for testing the light receiver and a time of flight can be imitated relative to the start time of the measurement via a controllable delay.

Overload measurements can in particular be easily carried out in this manner. The time behavior, that is the timing, of the distance measurement chain can be tested via a programmable variable delay before the light transmitter.

The dynamics of the light receiver can be tested via an adjustable signal level of the light transmitter. The reference light transmitter can be set up with a lower power transmission diode and thus less inexpensive transmission diode since, due to the spatial proximity, a smaller transmission power is sufficient to generate comparable signals on the receiver. The reference light transmitter can likewise be integrated in CMOS technology.

The reference light transmitter thus allows the following tests:

First, a linearity and an integrity of the received signals of the light receiver can be ensured for different delays or times of flight. The distance measurement can thus be checked indirectly.

Second, the dynamics and the sensitivity of the light receiver can be checked by measuring the signal level using different reference amplitudes. The measurements can also be used for compensating aging effects or degradation or for compensating temperature effects. Two reference targets are, for example, arranged in the light scanner for this purpose and the corresponding measured signals are measured once cyclically.

Third, e.g. overload measurements can be carried out as required.

In a preferred embodiment of the invention, the light scanner has a housing and a plurality of light scanners are connectable to one another via flexible connection lines.

A modular design serves as the basis for the light scanner. The light scanner, for example, has the components: Optics module with transmission optics and reception optics, measuring core with light transmitter and light receiver and/or back-end with control and evaluation unit, I/O drivers, bus interface and/or safety control.

The measuring core preferably comprises a high-integration CMOS-ASIC. A design of discrete components is, however, likewise possible.

Due to the good alignment characteristics of light, different variants of the light scanner can be realized with different opening angles and ranges modules which are adapted to different demands of different applications through corresponding optics.

In accordance with the invention, light transmitters and light receivers can be operated without transmission optics and reception optics, whereby a larger opening angle and a small range is achieved. However, the light beams can also be collimated or further expanded by optical elements.

The light receiver can be provided with a filter element, for example with a band pass filter, for restricting the external light incidence.

In a further development of the invention, the control and evaluation unit is configured with two channels.

The light scanner can be used as an independent safety sensor or safety light scanner due to the two-channel control and evaluation unit.

The light scanner is thereby itself able to carry out a plurality of self-tests and to ensure is own functionality in a comprehensive manner.

Furthermore, however, a plurality of light scanners can also communicate over a common bus and a central safety controller is used to configure the individual light scanners, to poll their states and, optionally, to feed in suitable test signals, to evaluate and compare the received signals, to signal warnings and, in case of danger, to stop a machine to be secured or to stop a self-driving vehicle to be secured.

It may be sufficient, for example, if every single light scanner on the common bus only reports when its measured values infringe or exceed previously taught thresholds or when a problem has been diagnosed In a self-diagnosis.

In an embodiment of the invention, a plurality of light scanners are arranged on a flexible carrier. The flexible carrier can be arranged and cut to length as required by a user. The lines for the supply and for the bus system for the exchange of data are integrated in the flexible carrier or in the flexible carrier ribbon. The flexible carrier can be a single-piece plastic or, for example, parts similar to chain links.

In a further development of the invention, a positional sensor is provided for evaluating the sensor position of the light scanner. A safety-relevant alignment of the light scanner is in particular provided.

If the single light scanner is positioned by the user and if it monitors the desired zone, it may be necessary to monitor this position of the monitored zone in order e.g. to recognize a maladjustment of the sensor due to mechanical effects. An MEMS positional sensor is used as the positional sensor, for example. MEMS stands for microelectromechanical system.

These positional sensors are today available at very favorable prices and are highly integrated due to high volumes in the consumer and automotive fields. Once the position has been taught once, the positional sensor recognizes every change and a safety controller connected downstream or a safety control connected downstream evaluates the position signals if a safety problem is produced by a maladjustment.

In addition, the positional sensor can serve as an alignment aid or as an electronic spirit level, which is in particular helpful on the adjustment of a sensor system having a number of single light scanners or of a system at the flexible carrier.

In a further development of the invention, the light scanner is an integrated light scanner module.

It is possible by the use of a CMOS process to integrate additional components such as the control and evaluation unit, the laser driver, the voltage supply and/or a temperature regulation logic on a chip together with the photosensitive receiver. All the components of the measurement chain of the light scanner can be integrated in a single ASIC using this technology. The ASIC is able to measure distance values independently and to forward the final result to the central control via a suitable bus.

The light transmitter, for example a laser, a VCSEL or a light emitting diode, can also be co-integrated on the integrated light scanner module, that is the chip, by means of a hybrid technology. The reference light receiver and/or the reference light transmitter can also be provided in the integrated light scanner module.

Furthermore, in accordance with the invention, a self-driving transport system having a plurality of light scanners is provided.

In addition to stationary security systems, a plurality of light scanners can also be used in mobile applications. In particular for securing self-driving transport systems. The plurality of light scanners in this respect together form a sensor system. For example, narrowly collimated sensors are used in a main direction of movement at a very high speed of the self-driving transport system to obtain a large range with a small response time. The light scanners can in this respect be arranged in matrix form in a plurality of rows. Light scanners having a larger detection angle and a smaller range are used at one side of the self-driving transport system to cover a wider zone. The smaller range is acceptable due to the smaller speed component. A common bus line connects the light sensors and is connected to a safety controller.

In a further development of the invention, a plurality of light scanners are arranged in circular form to detect a measured zone of 90°, 180°, 270° or 360°. The light scanners are arranged in the form of a full circle in the case of 360°.

A laser scanner is thereby formed which manages without any mechanically movable parts such as a deflection mirror. The light beams are transmitted in fan shape starting from a quasi-common origin so that, starting from a compact housing, an annular or part-annular protected field, monitored field or a measured zone is monitored by the light scanners. The light scanners are in this respect arranged in one or more rows.

The possibility of a background light measurement in the single photon avalanche diode array is interesting for a safety sensor. The external light is a dominating noise source via the shot noise in a single photon avalanche diode. The thermal noise is much smaller with respect to classical photodiode receivers since the transimpedance transducer which is customary in the classical reception path and which represents a main source for the thermal noise is not required.

The external light level can be determined via the number of incident external light photons on the light receiver on the single photon avalanche diode array in the transmission breaks of the measurement system. E.g. in the case of the listed CW method through a further gating signal which adds the single photon events in a counter in the corresponding transmission breaks.

For a secure detection of objects in a safe light scanner, a required signal-to-noise ratio can be previously defined at which an object has to be recognized under all circumstances. It can be monitored by the determination of the external light source during the measurement cycle whether the noise level becomes too large in comparison with an expected signal from the intruding object and whether safety-relevant shut down correspondingly has to take place.

The light scanner can be used for an inexpensive and compact securing of service robots. The light scanner can furthermore be used for a stationary securing of plants and machines. Different geometries of measured zones, e.g. small machine openings or saw blades, can be secured using a plurality of light scanners. A point-shaped near zone securing is furthermore possible, e.g. at machines and robots, using the light scanner. Doors and passages can furthermore be secured.

Figure 2:
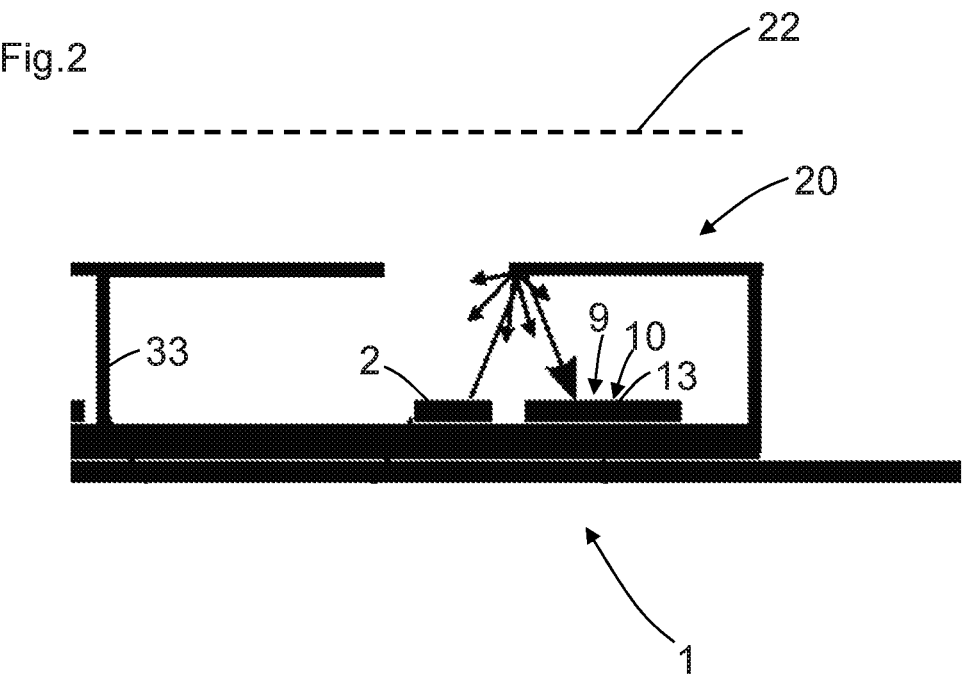
Figure 3:
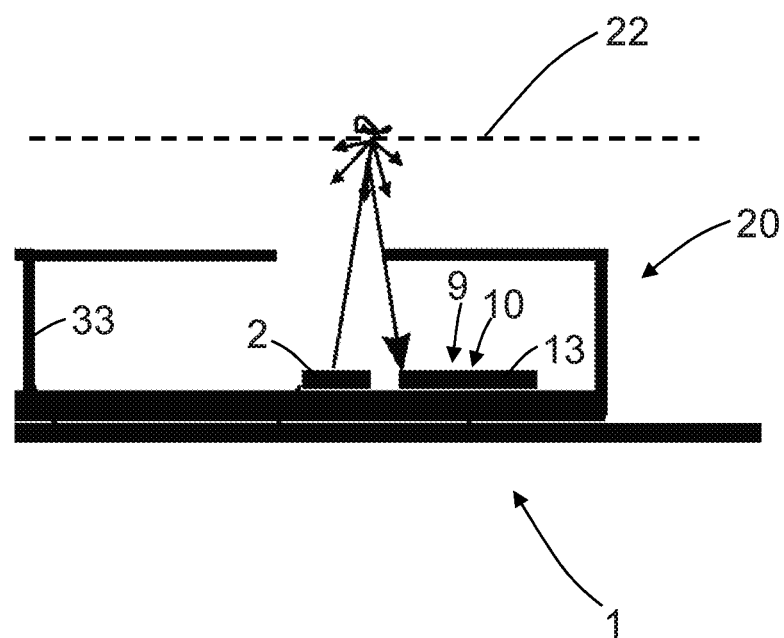
Figure 4:
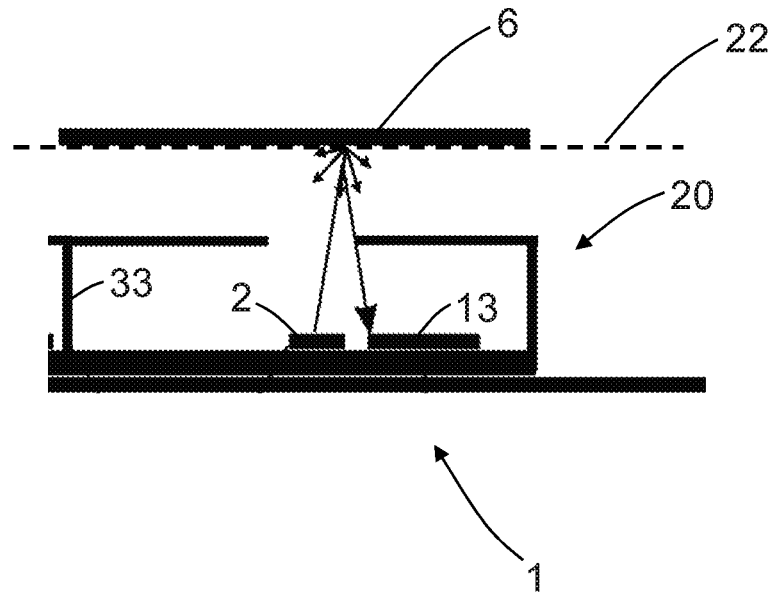
Figure 5:
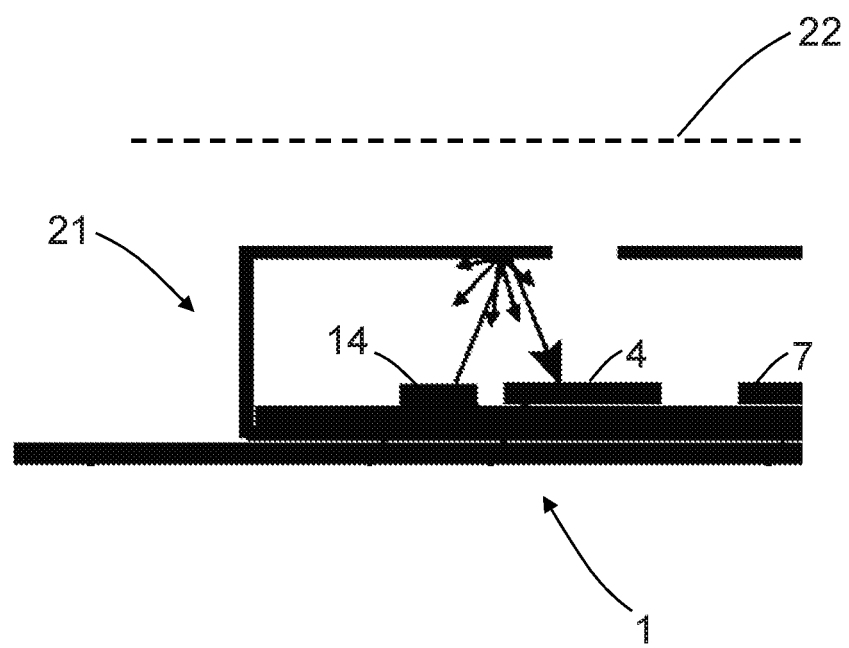
Figure 6:
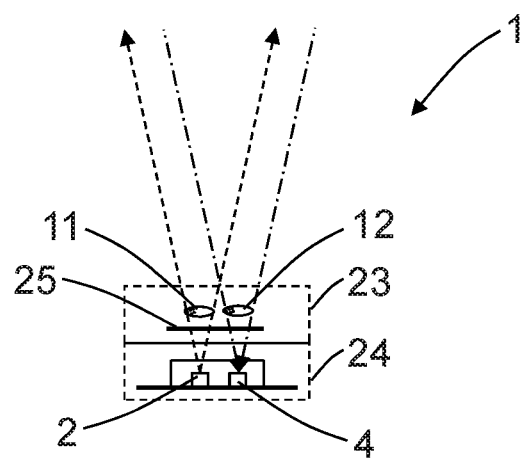
Figure 7:
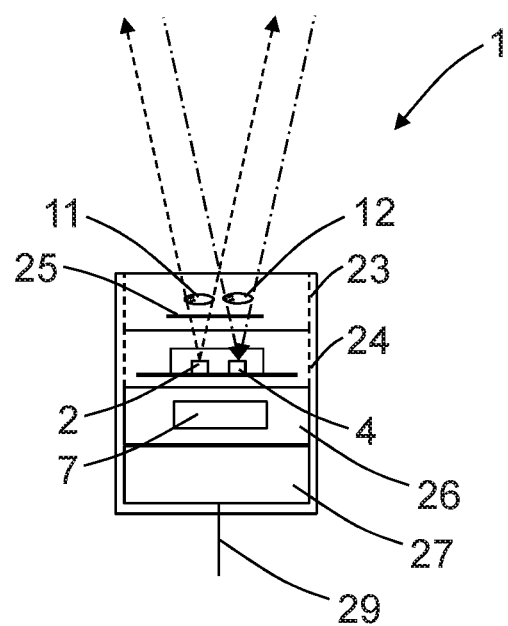
Figure 8:
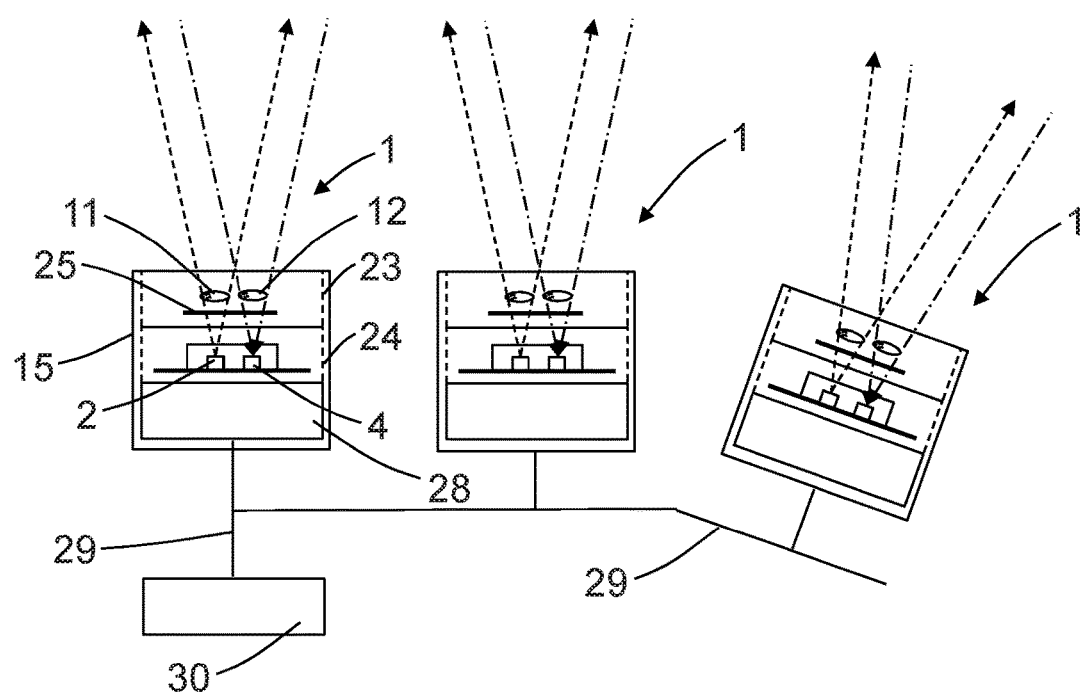
Figure 9:
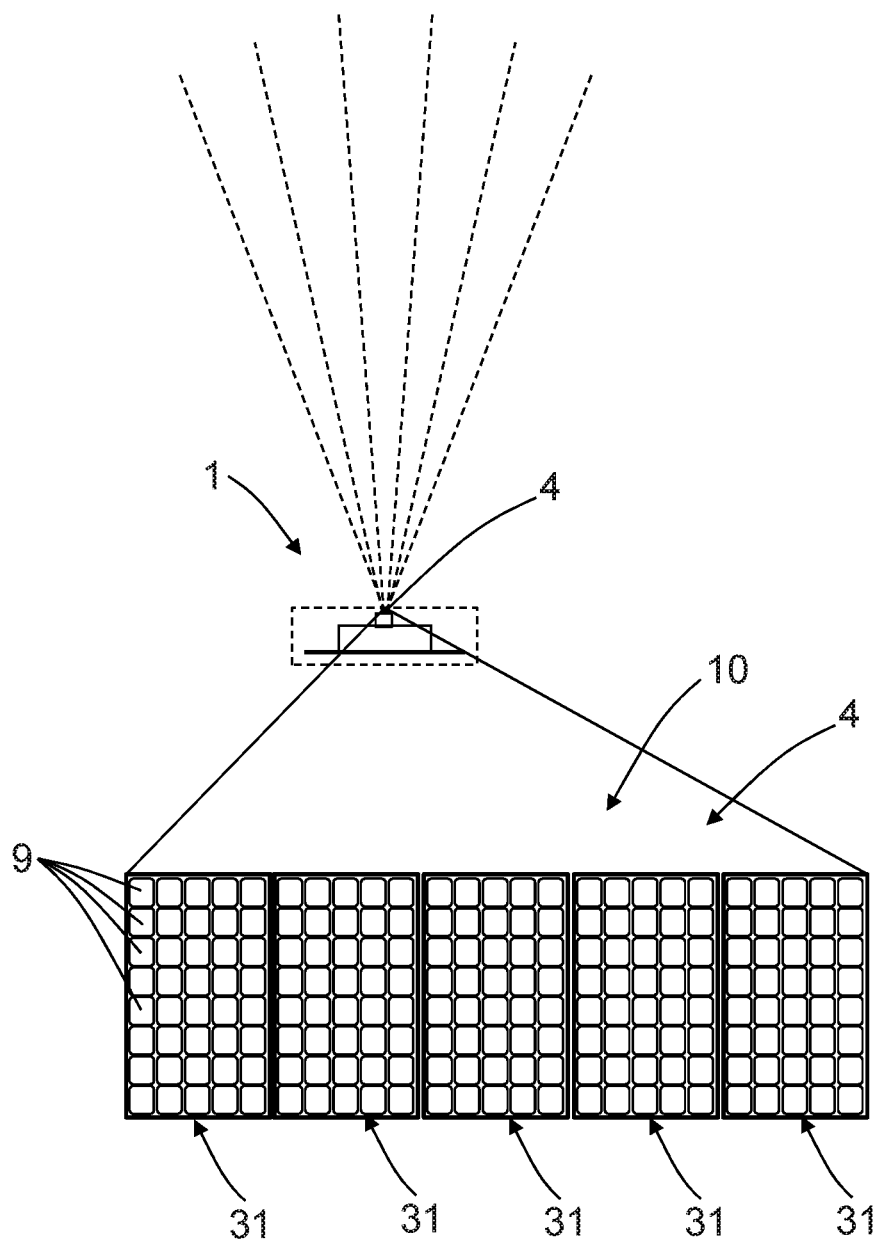

The invention will also be explained in the following with respect to further advantages and features with reference to the enclosed drawing and to embodiments. The Figures of the drawing show in:

FIG. 1 a light scanner in accordance with the invention;
FIG. 2 a first housing chamber of the light scanner;
FIG. 3 a first housing chamber of the light scanner;
FIG. 4 a first housing chamber of the light scanner;
FIG. 5 a second housing chamber of the light scanner;
FIG. 6 a light scanner with a band pass filter;
FIG. 7 a light scanner with an interface;
FIG. 8 a plurality of light scanners which are connected to one another via a bus line;
FIG. 9 a light scanner with a single photon avalanche diode array; and
FIG. 10 a self-driving transport system with arranged light scanners.

In the following Figures, identical parts are provided with identical reference numerals.

FIG. 1 shows a light scanner 1 in accordance with the principle of the time of flight having at least one light transmitter 2 which transmits consecutive light pulses 3 into a measured zone 5 and having at least one light receiver 4 which receives the light pulses 3 reflected at an object 6 in the measured zone 5 and supplies them in the form of received electrical signals to a control and evaluation unit 7 which determines a distance signal representative of the distance 8 of the object 6 from the light scanner 1 while taking account of the speed of light from the time between the transmission and reception of the light pulse 3, wherein the light receiver 4 has at least one single photon avalanche diode 9.

Different time of flight methods with a corresponding evaluation can be implemented for the distance measurement.

A pulse method can be provided. Furthermore, a CW (continuous wave) process can be used, with a light signal being used which is constant in time.

Furthermore, analog signals of the single photon diode 9 or of the single photon diode array 10 can be evaluated. A single photon diode array 10 is shown in FIG. 9. The analog signals are compared with a threshold value, are sampled or are evaluated using statistical methods.

In the evaluation according to the time of flight process, an amplitude value can be generated in addition to the distance value, e.g. by a histogram of the time stamps, by the count rate or by the voltage amplitude in an analog evaluation.

The light transmitter 2 is in this respect in accordance with FIG. 1 optionally arranged in a first housing chamber 20 and the light receiver 4 is arranged in a second adjacent housing chamber 21. The housing chambers 20, 31 are optically isolated by a channel separation 33 such that no direct optical connection is present between the light transmitter 2 and the light receiver 4. Only light of the light transmitter 2 reflected or remitted at an object 6 arrives at the light receiver 4. In accordance with FIG. 1, the light scanner 1 is an integrated light scanner module.

The light receiver 4 optionally has at least one array 10 comprising single photon avalanche diodes 9.

So that the light receiver 4 having the at least one single photon avalanche diode 9 is not already saturated by single photons, e.g. by external light, a number of single photon avalanche diodes 9 are arranged and are evaluated together. In principle, the analog signals of the single photon avalanche diode pixels or of the single photon avalanche diode elements are added. It is also possible to digitize each single photon avalanche diode 9 via an analog-to-digital converter and to evaluate them digitally.

To cover the option of a larger angular range by the light scanner 1 and nevertheless to obtain the required spatial resolution for the detection of e.g. a leg, the single photon avalanche diode array 10 can be broken down into so-called macropixels. 31, as shown in FIG. 9. The single photon avalanche diode array 10 is shown enlarged as a detail in FIG. 9. In this respect, a plurality of spatially adjacent single photon avalanche diode cells are associated with a common evaluation and evaluate the received light from a specific angular range via a corresponding optics. The arrangement can in this respect take place in a linear or areal manner.

The dynamics and/or an external light behavior can be scaled via the different single photon avalanche diodes 9 or the single photon avalanche diode arrays 10.

In accordance with FIG. 6, a transmission optics 11, in particular a lens, is arranged before the light transmitter 2. The transmission optics 11 is optionally integrated on a chip or in the chip housing to achieve an inexpensive and compact solution, in particular with high volumes.

Different monitoring angles and different ranges can be realized by different transmission optics 11.

In accordance with FIG. 6, a reception optics 12, in particular a lens, is arranged before the light receiver 4.

The reception optics 12 is optionally integrated on as chip or in the chip housing.

An optical band pass filter 25 can also be arranged, in particular vapor deposited, directly on the chip or on the light receiver to attenuate background light.

Different monitoring angles and different ranges can be realized by different reception optics 12.

In accordance with FIG. 2, a further light receiver is provided as a reference light receiver 13 as a second reception channel for a safety-relevant self-test.

The reference light receiver 13 is arranged in the same housing chamber 20 as the light transmitter 2 and is separated from the light receiver 4 by a channel separation 33. The reference light receiver 13 can in this respect be identical to the light receiver 4. The reference light receiver 13 can in particular be a single photon avalanche diode array 10.

The reference light receiver 13 allows different self-tests.

First, the power, in particular the laser power, of the light transmitter 2 can be monitored in every measurement cycle via scattered light within the housing chamber 20 of the light scanner 1 in the reference light receiver 13. Large deviations or a failure of the light transmitter 2 can thus be recognized.

Second, the exact time behavior or timing of the light transmitter 2 can be monitored and offsets which may occur can be corrected, e.g. on temperature influences.

Third, as shown in FIG. 3, a contaminated front screen 22 of the light scanner 1 can be detected via a change of the front screen echo due to backscatter at the dirt particles on the front screen 22.

Fourth, manipulation attempts, as shown in FIG. 4, can likewise be recognized via the backscatter to the reference light receiver 13, even if the light receiver 4 does not receive any signal. In accordance with FIG. 4, a manipulated object 6 is arranged in front of the front screen.

Fifth, in the phases in which no light is transmitted, the external light level can be measured at the reference light receiver 13. The corresponding measured signal can be compared with the signal of the light receiver 4, whereby the sensitivity of the light receiver 4 can be verified and can be used with an optional different scaling for checking the required signal-to-noise ratio in the actual measurement channel.

Additional measured values which are generated on the light receiver 4 and on the reference light receiver 13 allow a technical safety evaluation of the operational reliability.

A direct measurement of the external light level on the light receiver 4 and optionally on the reference light receiver 13 allows a good determination of the signal-to-noise ratio and allows a safety-relevant sensitivity of the system.

In accordance with FIG. 5, a further light transmitter is provided as a reference light transmitter 14 for the safety-relevant self-test.

The reference light transmitter 24 can be integrated in the housing chamber 21 of the light receiver 4 for testing the light receiver 4. A test of the reception channel to the time behavior or timing as well as effects dependent on the signal level can hereby be carried out. The reference light transmitter 14 is here preferably attached close to the light receiver 4 and can, for example, likewise be integrated in the CMOS.

Due to the spatial proximity, the additional reference light transmitter 14 can be realized with a lower power light transmitter and thus less expensive light transmitter. The transmission power of the reference light transmitter 14 is set such that the signal level corresponds to the actual received signals of the light receiver 4. The same applies to the time progression of the transmitted signal of the reference light transmitter 14.

Optical test pulses having different time progressions and amplitudes can be used for testing the light receiver 4 and a time of flight can be imitated via a controllable delay relative to the start time of the measurement.

Overload measurements can in particular easily be carried out in this manner. The time behavior, that is the timing, of the distance measurement chain, can be tested via a programmable variable delay before the light transmitter 2.

The dynamics of the light receiver 4 can be tested via an adjustable signal level of the light transmitter 2 or of the reference light transmitter 14. The reference light transmitter 14 can be set up with a lower power transmission diode and thus less inexpensive transmission diode since, due to the spatial proximity, a smaller transmission power is sufficient to generate comparable signals on the light receiver 4. The reference light transmitter can likewise be integrated in CMOS technology.

The reference light transmitter 14 thus allows the following tests:

First, a linearity and an integrity of the received signals of the light receiver 4 can be ensured for different delays or times of flight. The distance measurement can thus be checked indirectly.

Second, the dynamics and the sensitivity of the light receiver 4 can be checked by measuring the signal level using different reference amplitudes. The measurements can also be used for compensating aging effects or degradation or for compensating temperature effects. Two reference targets are, for example, arranged in the light scanner 1 for this purpose and the corresponding measured signals are measured once cyclically.

Third, e.g. overload measurements can be carried out as required.

It can have an advantageous effect here if the transmission and reception cones have a moderate opening angle and if diffusely reflective objects in the measured zone are not detected for energetic reasons whereas reflectors deliver sufficient signals for a recognition. This has the advantage that the demands on the controllable dynamics of the time of flight measurement system having the light transmitter 2 and the light receiver 4 are considerably reduced.

In accordance with FIG. 8, the light scanner 1 has a housing 15 and a plurality of light scanners are connectable to one another via flexible connection lines, in particular via a bus line 29.

A modular design as shown in FIG. 6 to FIG. 8 serves as the basis for the light scanner 1. The light scanner 1, for example, has the components: An optics module 23 with a transmission optics 11 and a reception optics 12, a measuring core 24 with a light transmitter 2 and a light receiver 3 and/or a back end 26 with a control and evaluation unit 7, I/O drivers, a bus interface 28 and/or a safety control or safety controller 30.

The measuring core 24 preferably comprises a high-integration CMOS-ASIC. A design of discrete components is, however, likewise possible.

Due to the good alignment characteristics of light, different variants of the light scanner 1 can be realized with different opening angles and ranges through corresponding optics modules 23 and are adapted to different demands of different applications.

in accordance with FIG. 1, light transmitters 2 and light receivers 4 can be operated without transmission optics and reception optics, whereby a greater opening angle and a small range is achieved. However, the light beams can also be collimated or further expanded by optical elements.

The light receiver 4 can be provided with a filter element, for example with a band pass filter 25, for restricting the external light incidence.

The control and evaluation unit 7 is optionally configured with two channels.

The light scanner 1 can be used as an independent safety sensor or safety light scanner due to the two-channel control and evaluation unit 7.

The light scanner 1 is thereby itself able to carry out a plurality of self-tests and to ensure is own functionality in a comprehensive manner.

Furthermore, as shown in FIG. 8, however, a plurality of light scanners 1 can also communicate over a common bus and a central safety controller 30 is used to configure the individual light scanners 1, to poll their states and, optionally, to feed in suitable test signals, to evaluate and compare the received signals, to signal warnings and, in case of danger, to stop a machine to be secured or to stop a self-driving vehicle to be secured.

It may be sufficient, for example, if every single light scanner 1 on the common bus only reports when its measured values infringe or exceed previously taught thresholds or when a problem has been diagnosed In a self-diagnosis.

Figure 10:
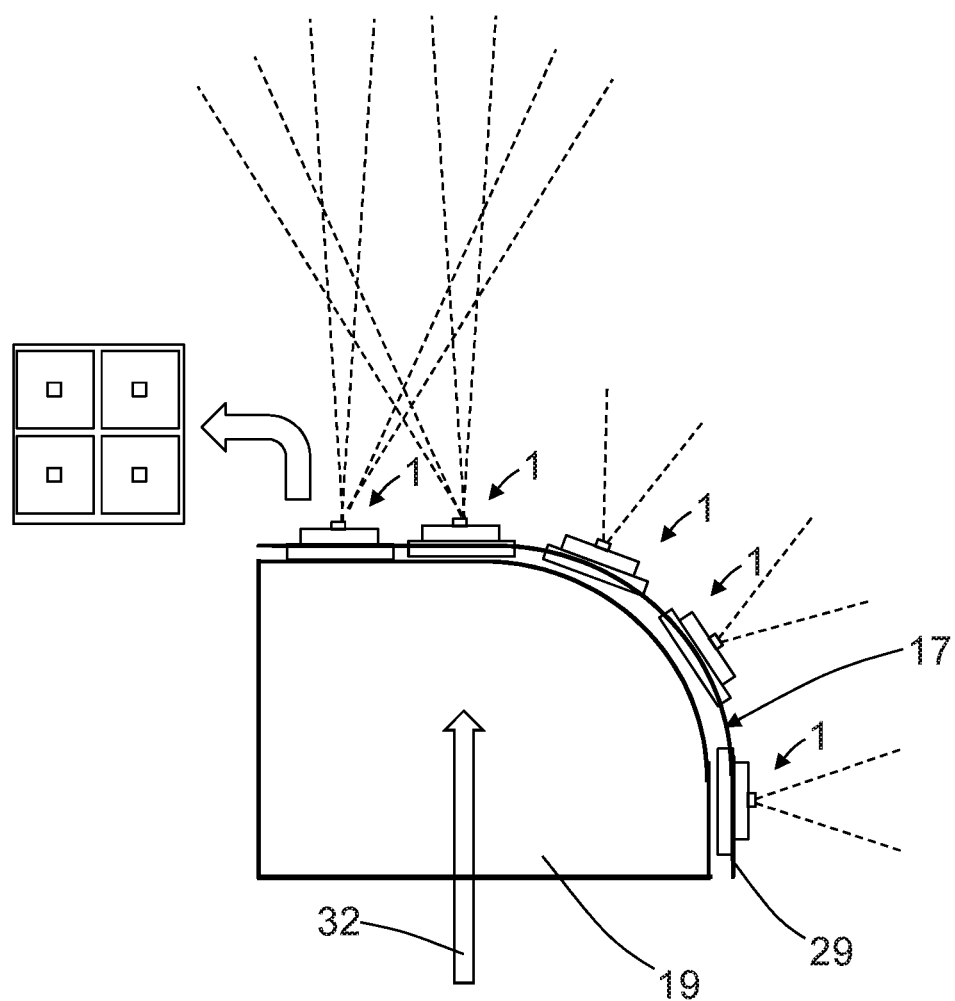

In accordance with FIG. 10, a plurality of light scanners are arranged on a flexible carrier. The flexible carrier 17 can be arranged and cut to length as required by a user. The lines for the supply and for the bus system for the exchange of data are integrated in the flexible carrier 17 or in the flexible carrier ribbon. The flexible carrier 17 can be a single-piece plastic or, for example, parts similar to chain links.

Optionally, a positional sensor is provided for evaluating the sensor position of the light scanner 1. A safety-relevant alignment of the light scanner 1 is in particular provided.

If the single light scanner 1 is positioned by the user and if it monitors the desired zone, it may be necessary to monitor this position of the monitored zone in order e.g. to recognize a maladjustment of the light scanner 1 due to mechanical effects. An MEMS positional sensor is used as the positional sensor, for example.

Once the position has been taught once, the positional sensor recognizes every change and a safety controller connected downstream or a safety control connected downstream evaluates the position signals if a safety problem is produced by a maladjustment.

In addition, the positional sensor can serve as an alignment aid or as an electronic spirit level, which is in particular helpful on the adjustment of a sensor system having a number of single light scanners or of a system at the flexible carrier.

In accordance with FIG. 10, a self-driving transport system 19 having a plurality of light scanners 1 is provided.

In addition to stationary security systems, a plurality of light scanners 1 can also be used in mobile applications. In particular for securing self-driving transport systems 19. The plurality of light scanners 1 in this respect together form a sensor system. For example, narrowly collimated sensors are used in a main direction of movement 32 at a very high speed of the self-driving transport system 19 to obtain a large range with a small response time. The light scanners 1 can in this respect be arranged in matrix form in a plurality of rows, as shown enlarged in a detail in FIG. 10. Light scanners 1 having a larger detection angle and a smaller range are used at one side of the self-driving transport system 19 to cover a wider zone. The smaller range is acceptable due to the smaller speed component. A common bus line 29 connects the light scanners 1 and establishes a connection to a safety controller.

In accordance with an embodiment, not shown, a plurality of light scanners are arranged in circular form to detect a measured zone of 90°, 180°, 270° or 360°. The light scanners are arranged in the form of a full circle in the case of 360°.

A laser scanner is thereby formed which manages without any mechanically movable parts such as a deflection mirror. The light beams are transmitted in fan shape starting from a quasi-common origin so that, starting from a compact housing, an annular or part-annular protected field, monitored field or a measured zone is monitored by the light scanners. The light scanners are in this respect arranged in one or more rows.

REFERENCE NUMERALS 1 light scanner
2 light transmitter
3 light pulses
4 light receiver
5 measured zone
6 object
7 control and evaluation unit
8 distance
9 single photon avalanche diodes
10 array
11 transmission optics
12 reception optics
13 reference light receiver
14 reference light transmitter
15 housing
16 connection lines
17 flexible carrier
19 self-driving transport system
20 first housing chamber
21 second housing chamber
22 front screen
23 optics module
24 measuring core
25 band pass filter
26 back end
27 interface
28 bus interface
29 bus line
30 safety controller
31 macropixel
22 main direction of movement
33 channel separation

The invention claimed is:

1. A light scanner in accordance with the time of flight principle having at least one light transmitter which transmits consecutive light pulses into a measured zone, the light scanner comprising:
at least one light receiver which receives the light pulses reflected at an object in the measured zone and supplies them in the form of received electrical signals to a control and evaluation unit, said evaluation unit determining a distance signal representative of the distance of the object from the light scanner while taking account of the speed of light from the time between the transmission and the reception of the light pulse, wherein the at least one light receiver has at least one single photon avalanche diode, wherein the at least one light transmitter is positioned within a first housing chamber and the at least one light receiver is positioned within a second housing chamber, the first and second housing chambers being optically isolated from one another such that the at least one light receiver does not receive unreflected portions of the consecutive light pulses transmitted by the at least one light transmitter;
a reference light receiver used as a second reception channel for a safety-relevant self-test, wherein the reference light receiver is positioned within the first housing chamber; and
a reference light transmitter for the safety-relevant self-test, wherein the reference light transmitter is positioned within the second housing chamber.

2. The light scanner in accordance with claim 1, wherein the light receiver has at least one array comprising single photon avalanche diodes.

3. The light scanner in accordance with claim 1, wherein a transmission optics is arranged in front of the light transmitter.

4. The light scanner in accordance with claim 3, wherein the transmission optics is a lens.

5. The light scanner in accordance with claim 1, wherein a reception optics is arranged in front of the light receiver.

6. The light scanner in accordance with claim 5, wherein the reception optics is a lens.

7. The light scanner in accordance with claim 1, wherein the light scanner has a housing and a plurality of light scanners are connectable to one another via flexible connection lines.

8. The light scanner in accordance with claim 1, wherein the control and evaluation unit is configured with two channels.

9. The light scanner in accordance with claim 1, wherein a plurality of light scanners are arranged on a flexible carrier.

10. The light scanner in accordance with claim 1, further comprising a positional sensor for evaluating the sensor position of the light scanner.

11. The light scanner in accordance with claim 1, wherein the light scanner is an integrated light scanner module.

12. The light scanner in accordance with claim 1, wherein a plurality of light scanners are arranged in circular form to detect a measured zone of 90 °, 180 °, 270° or 360°.

13. A self-driving transport system having a plurality of light scanners in accordance with the time of flight principle having at least one light transmitter which transmits consecutive light pulses into a measured zone and comprising:

- at least one light receiver which receives the light pulses reflected at an object in the measured zone and supplies them in the form of received electrical signals to a control and evaluation unit, said evaluation unit determining a distance signal representative of the distance of the object from the light scanner while taking account of the speed of light from the time between the transmission and the reception of the light pulse, wherein the at least one light receiver has at least one single photon avalanche diode, wherein the at least one light transmitter is positioned within a first housing chamber and the at least one light receiver is positioned within a second housing chamber, the first and second housing chambers being optically isolated from one another such that the at least one light receiver does not receive unreflected portions of the consecutive light pulses transmitted by the at least one light transmitter;
- a reference light receiver used as a second reception channel for a safety-relevant self-test, wherein the reference light receiver is positioned within the first housing chamber; and
- a reference light transmitter for the safety-relevant self-test, wherein the reference light transmitter is positioned within the second housing chamber.

* * * * *